United States Patent
Wei et al.

(10) Patent No.: US 10,841,633 B2
(45) Date of Patent: Nov. 17, 2020

(54) HOT LIVE VIDEO DETERMINING METHOD AND DEVICE

(71) Applicant: Huawei Technologies Co., Ltd., Guangdong (CN)

(72) Inventors: Qikun Wei, Nanjing (CN); Shen Zhang, Nanjing (CN); Qiujie Fu, Nanjing (CN); Jie Xiong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/213,221

(22) Filed: Dec. 7, 2018

(65) Prior Publication Data
US 2019/0110093 A1 Apr. 11, 2019

Related U.S. Application Data

(63) Continuation of application No. PCT/CN2017/086980, filed on Jun. 2, 2017.

(30) Foreign Application Priority Data

Jun. 8, 2016 (CN) .......................... 2016 1 0405195

(51) Int. Cl.
*H04N 7/173* (2011.01)
*H04N 21/24* (2011.01)
(Continued)

(52) U.S. Cl.
CPC ......... *H04N 21/2408* (2013.01); *H04N 7/173* (2013.01); *H04N 21/00* (2013.01);
(Continued)

(58) Field of Classification Search
CPC ........................ H04N 21/2393; H04N 21/2408
See application file for complete search history.

(56) References Cited

U.S. PATENT DOCUMENTS 9,898,748 B1 * 2/2018 Taylor ................ G06Q 30/0202
10,311,362 B1 * 6/2019 Mirza ....................... G06N 5/04
(Continued)

FOREIGN PATENT DOCUMENTS

CN 101207799 A 6/2008
CN 101277427 A 10/2008
(Continued)

OTHER PUBLICATIONS

Machine Translation and Abstract of Chinese Publication No. CN101110760, Jul. 28, 2010, 17 pages.
(Continued)

*Primary Examiner* — Gigi L Dubasky
(74) *Attorney, Agent, or Firm* — Conley Rose, P.C.

(57) ABSTRACT

A hot live video determining method is provided. A network device first obtains a plurality of video request messages for a target video; then determines statistical information of the target video based on the plurality of video request messages, where the statistical information includes a quantity of video request messages for the target video that are obtained in specified duration and fragment information of a video fragment requested in each video request message; and finally determines, based on the statistical information, whether the target video is a hot live video. According to the method, the network device can identify the hot live video in the Internet, so the network device can carry the hot live video in a multicast manner, to avoid breakdown that is of a network and a video server and that is caused by transmitting the hot live video in a unicast method.

18 Claims, 3 Drawing Sheets

Obtain a plurality of video request messages for a target video — S201

Determine statistical information of the target video based on the plurality of video request messages — S202

Determine, based on the statistical information, whether the target video is a hot live video — S203

(51) Int. Cl.
*H04N 21/845* (2011.01)
*H04N 21/258* (2011.01)
*H04N 21/00* (2011.01)
*H04N 21/643* (2011.01)
*H04N 21/442* (2011.01)
*H04N 21/2187* (2011.01)
*H04N 21/6405* (2011.01)

(52) U.S. Cl.
CPC ....... *H04N 21/2187* (2013.01); *H04N 21/258* (2013.01); *H04N 21/25891* (2013.01); *H04N 21/44222* (2013.01); *H04N 21/6405* (2013.01); *H04N 21/64322* (2013.01); *H04N 21/8456* (2013.01)

(56) References Cited

U.S. PATENT DOCUMENTS

| | | | |
|---|---|---|---|
| 2009/0113482 A1 | 4/2009 | Kawada et al. | |
| 2011/0145726 A1 | 6/2011 | Wei et al. | |
| 2011/0145871 A1 | 6/2011 | Lee et al. | |
| 2012/0254456 A1* | 10/2012 | Visharam | H04N 21/2343 709/231 |
| 2013/0024510 A1* | 1/2013 | Varvello | H04L 67/1093 709/204 |
| 2013/0081072 A1* | 3/2013 | Alward | H04L 41/145 725/14 |
| 2013/0124683 A1 | 5/2013 | Watanabe et al. | |
| 2013/0294747 A1 | 11/2013 | Takahashi | |
| 2014/0006478 A1 | 1/2014 | Eguchi et al. | |
| 2014/0269437 A1* | 9/2014 | Kotecha | H04W 4/06 370/259 |
| 2014/0325548 A1 | 10/2014 | O'Hern | |
| 2015/0029925 A1* | 1/2015 | Mantin | H04W 72/005 370/312 |
| 2016/0260141 A1* | 9/2016 | Zhang | H04N 21/8456 |
| 2018/0013983 A1* | 1/2018 | Chen | H04N 21/4788 |
| 2018/0070149 A1 | 3/2018 | Lohmar et al. | |

FOREIGN PATENT DOCUMENTS

| | | |
|---|---|---|
| CN | 101420554 A | 4/2009 |
| CN | 101110760 B | 7/2010 |
| CN | 102447973 A | 5/2012 |
| CN | 102487456 A | 6/2012 |
| CN | 103365936 A | 10/2013 |
| CN | 105491456 A | 4/2016 |
| JP | 2010041166 A | 2/2010 |
| JP | 2013510453 A | 3/2013 |
| KR | 101602525 B1 | 3/2016 |
| WO | 2007115224 A2 | 10/2007 |
| WO | 2010118556 A1 | 10/2010 |
| WO | 2012011467 A1 | 1/2012 |
| WO | 2012096372 A1 | 7/2012 |

OTHER PUBLICATIONS

Foreign Communication From a Counterpart Application, Japanese Application No. 2018-564300, Japanese Office Action dated Feb. 25, 2020, 2 pages.
Foreign Communication From a Counterpart Application, Japanese Application No. 2018-564300, English Translation of Japanese Office Action dated Feb. 25, 2020, 2 pages.
Foreign Communication From a Counterpart Application, Korean Application No. 10-2019-7000311, Korean Notice of Preliminary Rejection dated Dec. 23, 2019, 4 pages.

* cited by examiner

HOT LIVE VIDEO DETERMINING METHOD AND DEVICE

CROSS-REFERENCE TO RELATED APPLICATIONS

This application is a continuation of International Application No. PCT/CN2017/086980 filed on Jun. 2, 2017, which claims priority to Chinese Patent Application No. 201610405195.7 filed on Jun. 8, 2016. The disclosures of the aforementioned applications are hereby incorporated by reference in their entireties.

TECHNICAL FIELD

The present application relates to the field of Internet technologies, and in particular, to a hot live video determining method and a device.

BACKGROUND

Currently, many Internet video websites provide a live video service for a user, and transmission is performed most in a unicast manner based on the Hypertext Transfer Protocol (HTTP). A feature of the unicast manner is that a server directly sends video data to each client that requests a video service, and a feature of a live video is that audiences that watch a same program see repeated content. This means that a large amount of repeated data content is transmitted by transmitting the live video in the unicast manner, and the repeated data content occupies a large amount of network bandwidth. Consequently, network traffic and load of a video server are greatly increased, and network utilization is low.

Therefore, a multicast bearer Internet video service transmission manner appears in the industry. To be specific, a media stream is first obtained from the video server in the unicast manner, then transmitted in an operator network in a multicast manner, and finally sent to each client in the unicast manner near a terminal playing device. Therefore, the network traffic and the load of the video server are reduced by using a multicast bearer network. However, in the multicast bearer live video transmission manner, a live program channel that needs to perform multicast bearer transmission needs to be preconfigured, and transmission is performed in a multicast bearer manner only when a network device identifies the preconfigured live program channel. This preconfiguration manner takes a large amount of time. If multicast bearer transmission is not configured for a live program channel, even if a video played on the live program channel becomes a hot video, the video is still sent to the client in the unicast manner. In this case, a network and the video server may break down.

SUMMARY

A technical problem to be resolved in embodiments of the present disclosure is to provide a video transmission method and a related device, so as to identify a hot live video in the Internet, and avoid breakdown that is of a network and a video server and that is caused by transmitting the hot live video in a unicast manner.

A first aspect of the present disclosure provides a hot live video determining method. A first network device first obtains a plurality of video request messages for a target video, where each video request message includes fragment information of a requested video fragment of the target video; then determines statistical information of the target video based on the plurality of video request messages, where the statistical information includes a quantity of video request messages for the target video that are obtained in specified duration and fragment information of a video fragment requested in each video request message; and finally determines, based on the statistical information, whether the target video is a hot live video.

In the embodiments of the present disclosure, the first network device obtains the video request messages for the target video, determines the statistical information of the target video, and identifies the hot live video in the Internet by using the statistical information, so as to avoid breakdown that is of a network and a video server and that is caused by transmitting the hot live video in a unicast method.

With reference to the first aspect, in a first possible implementation of the first aspect, when the quantity of video request messages for the target video in the specified duration exceeds a first threshold, and a fragment interval between any two requested video fragments in the specified duration is less than a preset fragment interval threshold, the first network device may determine that the target video is a hot live video.

With reference to the first possible implementation of the first aspect, in a second possible implementation, the fragment information includes a playing time point of the video fragment, and the fragment interval threshold is a first duration threshold; and that a fragment interval between any two requested video fragments is less than a preset fragment interval threshold includes:

a difference between a playing time point of a first video fragment and a playing time point of a second video fragment in the any two requested video fragments is less than the first duration threshold.

With reference to the first possible implementation of the first aspect, in a third possible implementation, the fragment information includes a fragment identifier of the video fragment, and the fragment interval threshold is an identifier threshold; and that a fragment interval between any two requested video fragments is less than a preset fragment interval threshold includes:

a difference between a fragment identifier of a first video fragment and a fragment identifier of a second video fragment in the any two requested video fragments is less than the identifier threshold.

With reference to the first possible implementation of the first aspect, in a fourth possible implementation, the fragment information includes a fragment identifier of the video fragment; and that a fragment interval between any two requested video fragments is less than a preset fragment interval threshold includes:

a fragment identifier of a first video fragment and a fragment identifier of a second video fragment in the any two requested video fragments are the same.

With reference to the first aspect, in a fifth possible implementation, each video request message further includes an index file, and the index file includes a video fragment list of the target video and fragment duration of each video fragment;

the statistical information further includes duration of an interval between any two requested video fragments;

the first network device retrieves the fragment duration of each video fragment from the index file, and obtains fragment duration of a first video fragment and fragment duration of a second video fragment in the any two requested video fragments, and fragment duration of a video fragment between the first video fragment and the second video fragment in the video fragment list, so as to determine duration of an interval between the first video fragment and the second video fragment based on a sum of the fragment duration of the first video fragment, the fragment duration of the second video fragment, and the fragment duration of the video fragment between the first video fragment and the second video fragment; and when the quantity of video request messages for the target video in the specified duration exceeds the first threshold, and the duration of the interval between the first video fragment and the second video fragment in the any two requested video fragments is less than a second duration threshold, the first network device may determine that the target video is a hot live video.

With reference to the implementation of the first aspect, in a sixth possible implementation, the statistical information further includes a quantity of times of requesting each requested video fragment of the target video in the specified duration; and when the quantity of video request messages for the target video in the specified duration exceeds the first threshold, and there is a video fragment requested for a quantity of times that exceeds a second threshold in the specified duration, the first network device may determine that the target video is a hot live video.

With reference to any one of the first aspect, or the first to the sixth possible implementations of the first aspect, in a seventh possible implementation, the first network device directly receives the plurality of video request messages sent by a plurality of clients; or receives the plurality of video request messages for the target video program that are forwarded by at least one network device (for example, a forwarding router) of a network operator; or after a listening device of a network operator obtains the plurality of video request messages for the target video by listening on at least one network device (for example, a video server, a forwarding router, and a DNS server) of the network operator, receives the plurality of video request messages forwarded by the listening device.

With reference to the seventh possible implementation of the first aspect, in an eighth possible implementation, after determining that the target video is a hot live video, the first network device obtains a subsequent video fragment of the target video from a video server; and sends the subsequent video fragment of the target video to the at least one network device in a multicast bearer transmission manner based on the plurality of video request messages.

In the embodiments of the present disclosure, the first network device sends, to the at least one network device in a multicast manner, the received subsequent video fragment sent by the video server in a unicast manner, so as to avoid breakdown that is of a network and the video server and that is caused by transmitting the hot live video in the unicast method.

A second aspect of the present disclosure provides a device. The device includes a processor, a memory, and a communications interface. The processor is connected to the memory and the communications interface. For example, the processor may be connected to the memory and the communications interface by using a bus. The communications interface is configured to communicate with a network device such as a video server, and receive or send a message used in the method in the foregoing first aspect and each implementation of the first aspect from or to the network device such as the video server. The memory is configured to store a video request message, fragment information, and the like. The processor is configured to execute some or all processes of the first aspect.

A third aspect provides another device, and the device includes:

a message obtaining module, configured to obtain a plurality of video request messages for a target video, where each video request message includes fragment information of a requested video fragment of the target video;

a statistical information determining module, configured to determine statistical information of the target video based on the plurality of video request messages, where the statistical information includes a quantity of video request messages for the target video that are obtained in specified duration and fragment information of a video fragment requested in each video request message; and a hot live determining module, configured to determine, based on the statistical information, whether the target video is a hot live video.

With reference to the third aspect, in, the hot live determining module is specifically configured to: when the quantity of video request messages for the target video in the specified duration exceeds a first threshold, and a fragment interval between any two requested video fragments in the specified duration is less than a preset fragment interval threshold, determine that the target video is a hot live video.

With reference to the first possible implementation of the third aspect, in a second possible implementation, the fragment information includes a playing time point of the video fragment, and the fragment interval threshold is a first duration threshold; and that a fragment interval between any two requested video fragments is less than a preset fragment interval threshold includes:

a difference between a playing time point of a first video fragment and a playing time point of a second video fragment in the any two requested video fragments is less than the first duration threshold.

With reference to the first possible implementation of the third aspect, in a third possible implementation, the fragment information includes a fragment identifier of the video fragment, and the fragment interval threshold is an identifier threshold; and that a fragment interval between any two requested video fragments is less than a preset fragment interval threshold includes:

a difference between a fragment identifier of a first video fragment and a fragment identifier of a second video fragment in the any two requested video fragments is less than the identifier threshold.

With reference to the first possible implementation of the third aspect, in a fourth possible implementation, the fragment information includes a fragment identifier of the video fragment; and that a fragment interval between any two requested video fragments is less than a preset fragment interval threshold includes:

a fragment identifier of a first video fragment and a fragment identifier of a second video fragment in the any two requested video fragments are the same.

With reference to the implementation of the third aspect, in a fifth possible implementation, each video request message further includes an index file, and the index file includes a video fragment list of the target video and fragment duration of each video fragment;

the statistical information further includes duration of an interval between any two requested video fragments;

the statistical information determining module is specifically configured to: obtain, based on the index file, fragment duration of a first video fragment and fragment duration of a second video fragment in the any two requested video fragments, and fragment duration of a video fragment between the first video fragment and the second video fragment in the video fragment list, and determine duration of an interval between the first video fragment and the second video fragment; and the hot live determining module is specifically configured to: when the quantity of video request messages for the target video in the specified duration exceeds the first threshold, and the duration of the interval between the first video fragment and the second video fragment in the any two requested video fragments is less than a second duration threshold, determine that the target video is a hot live video.

With reference to the implementation of the third aspect, in a sixth possible implementation, the statistical information further includes a quantity of times of requesting each requested video fragment of the target video in the specified duration; and the hot live determining module is specifically configured to: when the quantity of video request messages for the target video in the specified duration exceeds the first threshold, and there is a video fragment requested for a quantity of times that exceeds a second threshold in the specified duration, determine that the target video is a hot live video.

With reference to any one of the third aspect, or the first to the sixth possible implementations of the third aspect, in a seventh possible implementation, the message obtaining module is specifically configured to: directly receive the plurality of video request messages sent by a plurality of clients; or receive the plurality of video request messages for the target video program that are forwarded by at least one network device of a network operator; or after a listening device of a network operator obtains the plurality of video request messages for the target video by listening on at least one network device of the network operator, receive the plurality of video request messages forwarded by the listening device.

With reference to the seventh possible implementation of the third aspect, in an eighth possible implementation, the device further includes:

a fragment obtaining module, configured to obtain a subsequent video fragment of the target video from a video server; and a multicast bearer transmission module, configured to send the subsequent video fragment of the target video to the at least one network device in a multicast bearer transmission manner based on the plurality of video request messages.

In the embodiments of the present disclosure, the network device obtains the video request messages for the target video, determines the statistical information of the target video, and identifies the hot live video in the Internet by using the statistical information, so as to carry the hot live video in the multicast manner, and avoid the breakdown that is of the network and the video server and that is caused by transmitting the hot live video in the unicast method.

BRIEF DESCRIPTION OF THE DRAWINGS

To describe the technical solutions in the embodiments of the present disclosure more clearly, the following briefly describes the accompanying drawings required for describing the embodiments.

DETAILED DESCRIPTION

The following describes the technical solutions in the embodiments of the present disclosure with reference to the accompanying drawings in the embodiments of the present disclosure.

In the embodiments of the present disclosure, a client or another network device may send video request messages for different program videos or video request messages for different definition videos of different programs, and a same method is used for determining whether each video or each definition video is a hot live video. Therefore, a video, namely, a target video is used as an example to describe the embodiments of the present disclosure. In specific implementation, it may be determined that video request messages that carry a same video identifier are used to request a same video, or video request messages that carry a same video quality identifier of a same video are used to request a same definition video of a same video. Methods used in the embodiments of the present disclosure may be performed by a network device (referred to as a "first network device" below) such as a policy server or a router.

Figure 1:
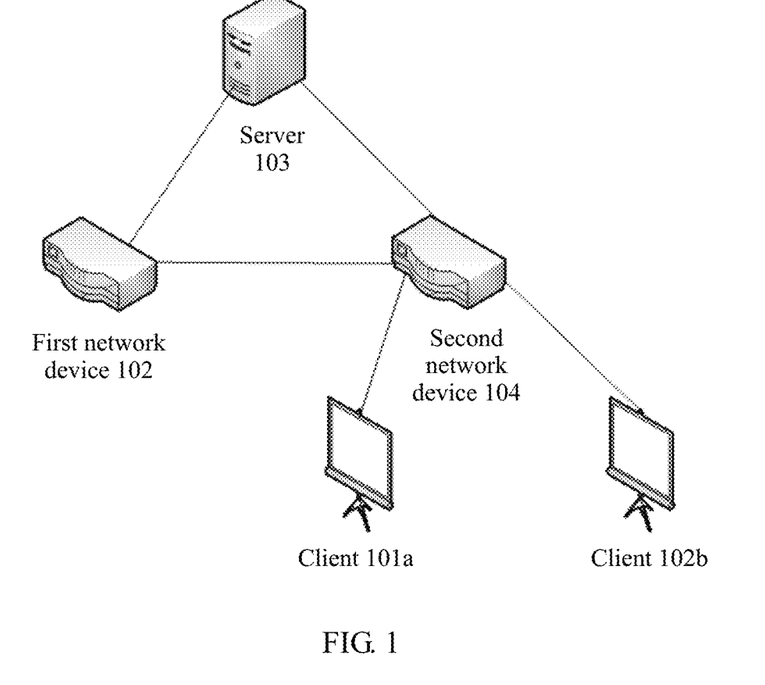
FIG. 1 is a schematic architectural diagram of a network video transmission system according to an embodiment of the present disclosure.

The technical solutions of the embodiments of the present disclosure are applicable to various network video transmission-based networks. For example, FIG. 1 shows a schematic architectural diagram of a network video transmission system, and the system includes at least one client 101 (a client 101a and a client 101b are shown in the figure), a first network device 102, and a video server 103. The system may further include at least one second network device 104. When there is the second network device 104 in the system, the client 101 may obtain a live video from the video server 103 by using the second network device 104, or may obtain a live video from the video server 103 by using the first network device 102 and the second network device 104. When there is no second network device 104 in the system, the client 101 obtains a live video from the video server 103 by using the first network device 102. In the architectural diagram of the system shown in FIG. 1, before the first network device 102 determines that a target video is a hot live video, the second network device may forward video data of the target video to the client in a unicast manner.

After the first network device determines that the target video is a hot live video, the first network device and the second network device jointly send the video data of the target video to the client in a multicast bearer transmission manner. An execution method described in the embodiments of the present disclosure is a method for determining whether the target video is a hot live video in a network environment shown in FIG. 1, so as to determine whether to convert a transmission manner of the target video.

Figure 2:
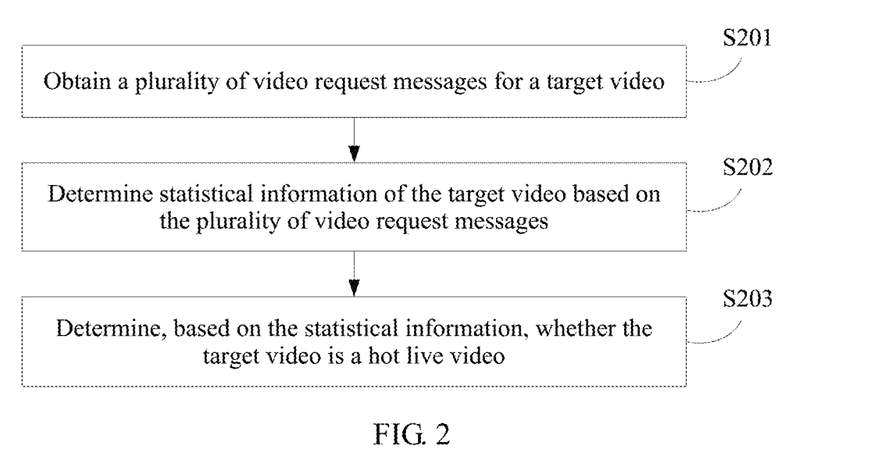
FIG. 2 is a schematic flowchart of a hot live video determining method according to an embodiment of the present disclosure.

Referring to FIG. 2, FIG. 2 is a schematic flowchart of a hot live video determining method according to an embodiment of the present disclosure. The method includes the following steps.

Step S201: Obtain a plurality of video request messages for a target video.

The video request messages for the target video may be sent to a network device such as a video server or a router of a network operator when a user visits a link corresponding to the target video. Each video request message may carry fragment information of a requested video fragment of the target video, and may further carry an identifier of a client that sends the video request message, an identifier of the requested target video, or the like. The fragment information may include a fragment identifier, a playing time point, and the like of the video fragment.

In a scenario of this embodiment, a first network device may directly receive the plurality of video request messages for the target video that are sent by a plurality of clients; or may receive the plurality of video request messages for the target video program that are forwarded by at least one network device of the network operator. Alternatively, after a listening device of the network operator obtains the plurality of video request messages for the target video by listening on at least one network device of the network operator, a first network device may receive the plurality of video request messages forwarded by the listening device.

For example, a domain name system (DNS) server may redirect an IP address of the video server to an IP address of the first network device, and the video request messages sent by the plurality of clients to the video server are actually sent to the first network device, so that the first network device may obtain the video request messages from the plurality of clients.

For another example, the plurality of clients separately send the video request messages to the video server by using a router accessed by each client, so that the routers may obtain the video request messages for the target video from the plurality of clients and report the video request messages to the first network device.

For still another example, in a process in which the plurality of clients send various messages including the video request messages to the network device such as the video server of the network operator, the listening device actively captures and analyzes all interaction information by listening on the at least one network device of the network operator, selects the video request messages, and reports the video request messages to the first network device. Herein, the listening device may be a network device such as a traffic monitoring device, an encryption device, a configuration device, or a forwarding device that is used in a process of interaction between a client and a network device such as the video server, the router, or the domain name server, or may be a listening device specialized in listening to network transmission information.

Step S202: Determine statistical information of the target video based on the plurality of video request messages.

The statistical information may include a quantity of video request messages for the target video that are obtained in specified duration and fragment information of a video fragment requested in each video request message. The specified duration may be a time length independently preset by the first network device, for example, three minutes. The first network device counts the obtained video request messages for the target video in the specified duration, and may determine the quantity of video request messages for the target video in the specified duration. In addition, each video request message carries the fragment information of the requested video fragment, so that the fragment information of the video fragment requested in each video request message may be directly obtained.

Step S203: Determine, based on the statistical information, whether the target video is a hot live video.

If a video is a live video, and visits of the live video exceed a specific quantity, it may be considered that the live video is hot, namely, a hot live video. In a process of determining whether the target video is a hot live video, it may be first determined whether the target video is a live video, and then determined whether the target video is a hot video, or it may be first determined whether the target video is a hot video, and then determined whether the target video is a live video. Only when the target video meets a condition of the hot video and meets a condition of the live video, it may be determined that the target video is a hot live video.

In a possible implementation, when the quantity of video request messages for the target video in the specified duration exceeds a first threshold, and a fragment interval between any two requested video fragments in the specified duration is less than a preset fragment interval threshold, it may be determined that the target video is a hot live video.

Specifically, the first threshold may be a quantity threshold that is preset by the first network device and that is used to determine whether the target video is hot. When the quantity of video request messages for the target video in the specified duration exceeds the first threshold, it may be considered that the target video is a hot video. In addition, the statistical information includes the fragment information of the video fragment requested in each video request message, and the fragment interval between the any two requested video fragments in the specified duration may be determined based on the fragment information included in each video request message. Herein, the fragment interval may be a fragment time interval between video fragments, or may be a fragment quantity interval between video fragments. Further, it may be determined whether the fragment interval between the any two requested video fragments in the specified duration is less than the preset fragment interval threshold. When the fragment interval between the any two requested video fragments in the specified duration is less than the preset fragment interval threshold, it may be considered that the target video is also a live video. It should be noted that the fragment interval threshold herein is a threshold of the fragment interval, and may correspondingly be a threshold in a unit of time or a threshold in a unit of quantity based on a type of the fragment interval. Finally, it may be determined that the target video is a hot live video.

In some implementation scenarios, the fragment information may include the playing time point of the video fragment. The first network device may calculate a difference between a playing time point of a first video fragment and a playing time point of a second video fragment in the any two requested video fragments based on a playing time point of each video fragment. If the calculated difference is less than a first duration threshold, it may be determined that the target video is a live video. It should be noted that the difference between the playing time point of the first video fragment and the playing time point of the second video fragment may be an absolute value. In addition, the playing time point is a playing start time point of a current video fragment in the target video. For example, a playing time point of a video fragment is 4 min 12 s, to be specific, the video fragment carries a segment of video data that starts to be played at 4 min 12 s.

Three video fragments are used as an example for description. It is assumed that three video request messages obtained in the specified duration respectively carry playing time points of three video fragments. A playing time point of a video fragment A in a first video request message is 15 min 10 s, a playing time point of a video fragment B is 15 min 11 s, and a playing time point of a video fragment C is 15 min 14 s. It is assumed that a preset first duration threshold is 10 seconds. A difference between the playing time point of the video fragment A and the playing time point of the video fragment B is one second, a difference between the playing time point of the video fragment A and the playing time point of the video fragment C is four seconds, and a difference between the playing time point of the video fragment B and the playing time point of the video fragment C is three seconds. Each difference between any two playing time points of the three video fragments is less than the first duration threshold 10 seconds, and it may be determined that the target video is a live video.

Particularly, in a streaming media protocol of Silverlight, the fragment identifier of the video fragment carries the playing time point of the video fragment. For example, 1431482316938020 in the fragment identifier Fragments (video=1431482316938020) is the playing time point of the video fragment. Therefore, the fragment interval between the any two requested video fragments may be determined directly based on the playing time point in the fragment identifier.

In some other implementation scenarios, the fragment information may include the fragment identifier of the video fragment. If fragment identifiers are identifiers ranked based on a preset rule or sequence, and each video fragment of the target video is divided based on a preset time length, the first network device may calculate a difference between a fragment identifier of a first video fragment and a fragment identifier of a second video fragment in the any two requested video fragments based on the fragment identifier of the video fragment. If the calculated difference is less than an identifier threshold, it may be determined that the target video is a live video. It should be noted that the difference between the fragment identifier of the first video fragment and the fragment identifier of the second video fragment may be an absolute value.

For example, it is assumed that fragment identifiers of video fragments of the target video are fragment identifiers ranked based on an Arabic numeral sequence, and all video fragments have a same time length. If fragment identifiers in the obtained video request messages are respectively a fragment 10, a fragment 12, a fragment 13, and a fragment 15, it may be determined that a difference between fragment identifiers of the fragment 10 and the fragment 12 is 2, a difference between fragment identifiers of the fragment 10 and the fragment 13 is 3, a difference between fragment identifiers of the fragment 10 and the fragment 15 is 5, a difference between fragment identifiers of the fragment 12 and the fragment 13 is 1, a difference between fragment identifiers of the fragment 12 and the fragment 15 is 3, and a difference between fragment identifiers of the fragment 13 and the fragment 15 is 2. It is assumed that the identifier threshold is 10. Each difference between any two fragment identifiers of the four video fragments is less than the identifier threshold 10, and it may be determined that the target video is a live video.

Particularly, when fragment identifiers of the target video are not fragment identifiers ranked based on a preset numeral rule, for example, the fragment identifier is a character identifier, and the fragment identifier of the first video fragment and the fragment identifier of the second video fragment in the any two requested video fragments are the same, it may be considered that the fragment interval between the any two requested video fragments is 0, and is certainly less than the preset fragment interval threshold, and it may be determined that the target video is a live video.

In some other implementation scenarios, each video request message further includes an index file, and the index file includes a video fragment list of the target video and fragment duration of each video fragment. Herein, the video fragment list may be a list of a plurality of video fragments of the target video that are ranked based on a time sequence.

In specific implementation, the first network device may obtain, based on the index file, fragment duration of a first video fragment and fragment duration of a second video fragment in the any two requested video fragments, and fragment duration of a video fragment between the first video fragment and the second video fragment. Specifically, the fragment duration of the first video fragment and the fragment duration of the second video fragment in the any two requested video fragments may be retrieved from the index file by using a retrieval identifier, the fragment identifier, or the like of the video fragment, and fragment duration of each video fragment between the first video fragment and the second video fragment is determined based on the video fragment list. A sum of the fragment duration of the first video fragment, the fragment duration of the second video fragment, and the fragment duration of the video fragment between the first video fragment and the second video fragment is duration of an interval between the first video fragment and the second video fragment. When the duration of the interval between the first video fragment and the second video fragment in the any two requested video fragments is less than a second duration threshold, it may be determined that the target video is a live video.

For example, as shown in a comparison table in Table 1, it is assumed that the index file includes a video fragment list of six video fragments of the target video and fragment duration corresponding to each video fragment.

TABLE 1

Index file table (example)

| Video Fragment List (Fragment Identifier) | Fragment Duration (ms) |
| --- | --- |
| 121 | 10 |
| 145 | 20 |
| 254 | 15 |
| 334 | 23 |
| 789 | 12 |
| 356 | 47 |

Assuming that video fragments requested in three video request messages obtained in the specified duration are respectively video fragments whose fragment identifiers are 121, 254, and 334, it may be determined, based on ranking of video fragments in the video fragment list and the fragment duration corresponding to each video fragment in the index file, that duration of an interval between video fragments whose fragment identifiers are 121 and 254 is 10+20+15=45 ms, duration of an interval between video fragments whose fragment identifiers are 121 and 334 is 10+20+15+23=68 ms, and duration of an interval between video fragments whose fragment identifiers are 254 and 334 is 15+23=38 ms. If the second duration threshold is set to 1 s, duration of each interval between any two of the three video fragments is less than the second duration threshold, and it may be determined that the target video is a live video.

In another possible implementation, the statistical information further includes a quantity of times of requesting each requested video fragment of the target video in the specified duration. When the quantity of video request messages for the target video in the specified duration exceeds a first threshold, and there is a video fragment requested for a quantity of times that exceeds a second threshold in the specified duration, it may be determined that the target video is a hot live video. Herein, the quantity of times of requesting each requested video fragment of the target video in the specified duration may be determined by counting, by the first network device in the specified duration, a quantity of times each requested video fragment is requested in the video request message.

Specifically, the same as the foregoing possible implementation, when the quantity of video request messages for the target video in the specified duration exceeds the first threshold, it may be considered that the target video is a hot video. In addition, it may be determined, based on the quantity of times of requesting each requested video fragment of the target video in the specified duration in the statistical information, whether there is a video fragment requested for a quantity of times that exceeds the second threshold in the specified duration. When there is a video fragment requested for a quantity of times that exceeds the second threshold in the specified duration, it may be considered that the video fragments requested in the plurality of video request messages are mainly concentrated on a video fragment or video fragments in a time range, and it may be considered that the target video is also a live video.

In the embodiment shown in FIG. 2, the first network device obtains the plurality of video request messages for the target video, where each video request message includes the fragment information of the requested video fragment of the target video; may determine the statistical information of the target video based on the plurality of video request messages, where the statistical information includes the quantity of video request messages for the target video that are obtained in the specified duration and the fragment information of the video fragment requested in each video request message; and may determine, based on the quantity of video request messages and the fragment information of the video fragment in the statistical information, whether the target video is a hot live video. In other words, in this embodiment of the present disclosure, the first network device obtains the video request messages for the target video, determines the statistical information of the target video, and identifies the hot live video in the Internet by using the statistical information, so as to avoid breakdown that is of a network and the video server and that is caused by transmitting the hot live video in a unicast method.

Figure 3:
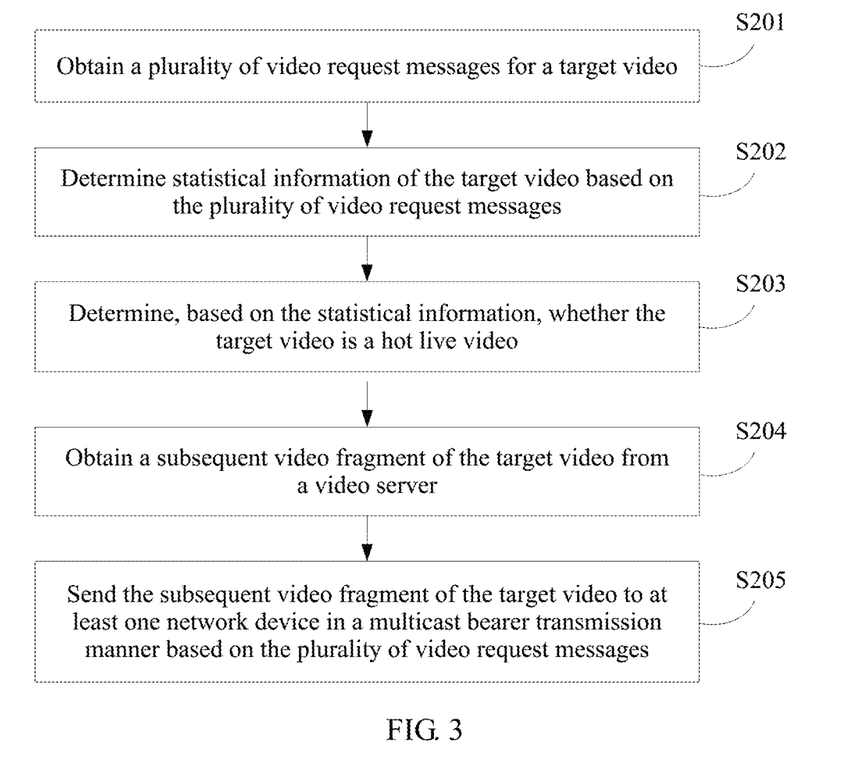
FIG. 3 is a schematic flowchart of a hot live video transmission method according to an embodiment of the present disclosure.

Referring to FIG. 3, in an optional embodiment, after the target video is determined as a hot live video in step S203, the method may further include the following steps.

Step S204: Obtain a subsequent video fragment of the target video from a video server.

After determining that the target video is a hot live video, the first network device may send a video request for the target video to the video server. After receiving the video request, the video server stops directly sending the subsequent video fragment of the target video to the client in the unicast manner, and sends the subsequent video fragment of the target video to the first network device, so that the first network device obtains the subsequent video fragment of the target video.

For example, in the network system shown in FIG. 1, after determining that the target video is a hot live video, the first network device 102 sends a unicast video request to the video server. After receiving the unicast video request, the video server stops sending the subsequent video fragment of the target video to the second network device 104 in the unicast manner, and sends the subsequent video fragment of the target video to the first network device in the unicast manner, so that the first network device obtains the subsequent video fragment of the target video.

Step S205: Send the subsequent video fragment of the target video to at least one network device in a multicast bearer transmission manner based on the plurality of video request messages.

After receiving the video fragment that is of the live video and that is sent by the video server, the first network device may send, in the multicast bearer transmission manner, the subsequent video fragment to at least one client requesting the target video or a network device corresponding to each client, such as a router.

For example, in the network system shown in FIG. 1, the first network device 102 sends, to the at least one second network device 104 in a multicast manner, the subsequent video fragment sent by the video server in the unicast manner, and the at least one second network device 104 sends, in a unicast transmission manner to the clients that send the video request messages, the subsequent video fragment transmitted in the multicast manner.

In this embodiment of the present disclosure, the first network device sends, to the at least one network device in a multicast bearer manner, the received subsequent video fragment sent by the video server in the unicast manner, so as to avoid the breakdown that is of the network and the video server and that is caused by transmitting the hot live video in the unicast method.

Figure 4:
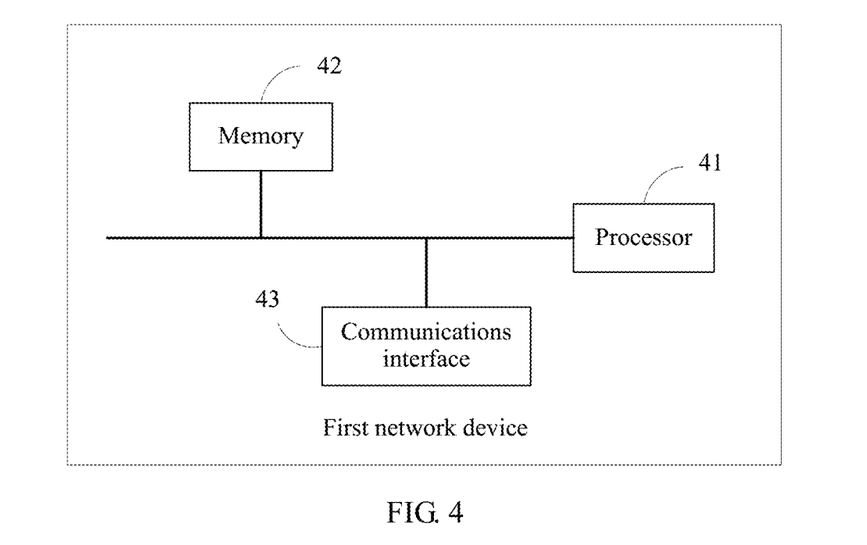
FIG. 4 is a schematic structural diagram of a network device according to an embodiment of the present disclosure.

Referring to FIG. 4, FIG. 4 is a schematic structural diagram of a network device according to an embodiment of the present disclosure. As shown in FIG. 4, the device includes a processor 41, a memory 42, and a communications interface 43. The processor 41 is connected to the memory 42 and the communications interface 43. For example, the processor 41 may be connected to the memory 42 and the communications interface 43 by using a bus.

The processor 41 is configured to support the network device in performing a corresponding function in the foregoing method. The processor 41 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logical device (CPLD), a field programmable gate array (FPGA), generic array logic (GAL), or any combination thereof.

The memory 42 is configured to store a video request message, fragment information, program code, and the like. The memory 42 may include a volatile memory, for example, a random access memory (RAM); or the memory 42 may include a nonvolatile memory, for example, a read-only memory (ROM), a flash memory, a hard disk (HDD), or a solid-state drive (SSD); or the memory 42 may include a combination of the foregoing types of memories.

The communications interface 43 is configured to communicate with a video server and another network device to receive or send a message used in the foregoing method.

The processor 41 may invoke the program code to perform the following operations:

obtaining a plurality of video request messages for a target video, where each video request message includes fragment information of a requested video fragment of the target video; determining statistical information of the target video based on the plurality of video request messages, where the statistical information includes a quantity of video request messages for the target video that are obtained in specified duration and fragment information of a video fragment requested in each video request message; and determining, based on the statistical information, whether the target video is a hot live video.

Optionally, when the quantity of video request messages for the target video in the specified duration exceeds a first threshold, and a fragment interval between any two requested video fragments in the specified duration is less than a preset fragment interval threshold, the processor 41 determines that the target video is a hot live video.

Optionally, each video request message further includes an index file, and the index file includes a video fragment list of the target video and fragment duration of each video fragment. The statistical information further includes duration of an interval between any two requested video fragments. The processor 41 obtains, based on the index file, fragment duration of a first video fragment and fragment duration of a second video fragment in the any two requested video fragments, and fragment duration of a video fragment between the first video fragment and the second video fragment in the video fragment list, and determines duration of an interval between the first video fragment and the second video fragment. When the quantity of video request messages for the target video in the specified duration exceeds the first threshold, and the duration of the interval between the first video fragment and the second video fragment in the any two requested video fragments is less than a second duration threshold, the processor 41 determines that the target video is a hot live video.

Optionally, the statistical information further includes a quantity of times of requesting each requested video fragment of the target video in the specified duration. When the quantity of video request messages for the target video in the specified duration exceeds the first threshold, and there is a video fragment requested for a quantity of times that exceeds a second threshold in the specified duration, the processor 41 determines that the target video is a hot live video.

Optionally, the processor 41 directly receives, by using the communications interface 43, the plurality of video request messages sent by a plurality of clients; or receives the plurality of video request messages for the target video program that are forwarded by at least one network device of a network operator. Alternatively, after a listening device of a network operator obtains the plurality of video request messages for the target video by listening on at least one network device of the network operator, the processor 41 receives, by using the communications interface 43, the plurality of video request messages forwarded by the listening device.

Further, after determining that the target video is a hot live video, the processor 41 obtains a subsequent video fragment of the target video from a video server; and sends the subsequent video fragment of the target video to the at least one network device in a multicast bearer transmission manner based on the plurality of video request messages.

Figure 5:
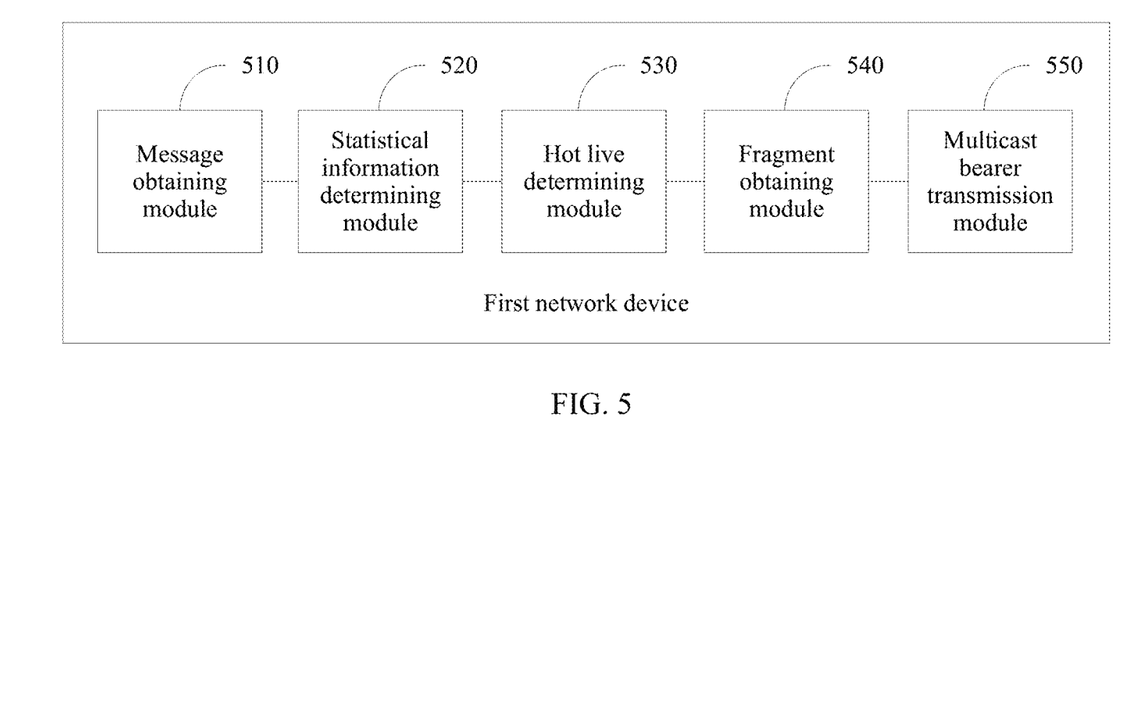
FIG. 5 is a schematic structural diagram of another network device according to an embodiment of the present disclosure.

Referring to FIG. 5, FIG. 5 is a schematic structural diagram of another network device according to an embodiment of the present disclosure. As shown in FIG. 5, the device includes:

a message obtaining module 510, configured to obtain a plurality of video request messages for a target video, where each video request message includes fragment information of a requested video fragment of the target video;

a statistical information determining module 520, configured to determine statistical information of the target video based on the plurality of video request messages, where the statistical information includes a quantity of video request messages for the target video that are obtained in specified duration and fragment information of a video fragment requested in each video request message; and a hot live determining module 530, configured to determine, based on the statistical information, whether the target video is a hot live video.

Optionally, the hot live determining module 530 is configured to:

when the quantity of video request messages for the target video in the specified duration exceeds a first threshold, and a fragment interval between any two requested video fragments in the specified duration is less than a preset fragment interval threshold, determine that the target video is a hot live video.

Optionally, the fragment information includes a playing time point of the video fragment, and the fragment interval threshold is a first duration threshold; and that a fragment interval between any two requested video fragments is less than a preset fragment interval threshold includes:

a difference between a playing time point of a first video fragment and a playing time point of a second video fragment in the any two requested video fragments is less than the first duration threshold.

Optionally, the fragment information includes a fragment identifier of the video fragment, and the fragment interval threshold is an identifier threshold; and that a fragment interval between any two requested video fragments is less than a preset fragment interval threshold includes:

a difference between a fragment identifier of a first video fragment and a fragment identifier of a second video fragment in the any two requested video fragments is less than the identifier threshold.

Optionally, the fragment information includes a fragment identifier of the video fragment; and that a fragment interval between any two requested video fragments is less than a preset fragment interval threshold includes:

a fragment identifier of a first video fragment and a fragment identifier of a second video fragment in the any two requested video fragments are the same.

Optionally, each video request message further includes an index file, and the index file includes a video fragment list of the target video and fragment duration of each video fragment;

the statistical information further includes duration of an interval between any two requested video fragments;

the statistical information determining module 520 is configured to:

obtain, based on the index file, fragment duration of a first video fragment and fragment duration of a second video fragment in the any two requested video fragments, and fragment duration of a video fragment between the first video fragment and the second video fragment in the video fragment list, and determine duration of an interval between the first video fragment and the second video fragment; and the hot live determining module 530 is configured to:

when the quantity of video request messages for the target video in the specified duration exceeds the first threshold, and the duration of the interval between the first video fragment and the second video fragment in the any two requested video fragments is less than a second duration threshold, determine that the target video is a hot live video.

Optionally, the statistical information further includes a quantity of times of requesting each requested video fragment of the target video in the specified duration; and the hot live determining module 530 is configured to:

when the quantity of video request messages for the target video in the specified duration exceeds the first threshold, and there is a video fragment requested for a quantity of times that exceeds a second threshold in the specified duration, determine that the target video is a hot live video.

Optionally, the message obtaining module 510 is configured to:

directly receive the plurality of video request messages sent by a plurality of clients; or receive the plurality of video request messages for the target video program that are forwarded by at least one network device of a network operator; or after a listening device of a network operator obtains the plurality of video request messages for the target video by listening on at least one network device of the network operator, receive the plurality of video request messages forwarded by the listening device.

Optionally, the device further includes:

a fragment obtaining module 540, configured to obtain a subsequent video fragment of the target video from a video server; and a multicast bearer transmission module 550, configured to send the subsequent video fragment of the target video to the at least one network device in a multicast bearer transmission manner based on the plurality of video request messages.

In this embodiment of the present disclosure, the network device obtains the video request messages for the target video, determines the statistical information of the target video, and identifies the hot live video in the Internet by using the statistical information, so as to carry the hot live video in a multicast manner, and avoid breakdown that is of a network and the video server and that is caused by transmitting the hot live video in a unicast method.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a ROM, a RAM, or the like.

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A hot live video determining method, comprising:
obtaining a plurality of video request messages for a target video, wherein each of the plurality of video request messages comprises respective fragment information of a requested video fragment of the target video;
determining statistical information of the target video based on the plurality of video request messages, wherein the statistical information comprises a quantity of video request messages from the plurality of video request messages that are obtained in a specified duration and fragment information of a video fragment that is requested in each of the plurality of video request messages; and
determining, based on the statistical information, whether the target video is a hot live video, wherein the target video is the hot live video when the quantity of video request messages in the specified duration exceeds a first threshold and a fragment interval between any two requested video fragments in the specified duration is less than a preset fragment interval threshold.

2. The hot live video determining method of claim 1, wherein the fragment information comprises a playing time point of the video fragment, wherein the fragment interval between any two of the requested video fragments being less than the preset fragment interval threshold represents a difference between a first playing time point of a first video fragment in any two of the requested video fragments and a second playing time point of a second video fragment in any two of the requested video fragments being less than the preset fragment interval threshold, wherein the preset fragment interval threshold is a first duration threshold.

3. The hot live video determining method of claim 1, wherein the fragment information comprises a fragment identifier of the video fragment, wherein the fragment interval between any two of the requested video fragments being less than the preset fragment interval threshold represents a difference between a first fragment identifier of a first video fragment of any two of the requested video fragments and a second fragment identifier of a second video fragment in any two of the requested video fragments being less than the preset fragment interval threshold, wherein the preset fragment interval threshold is an identifier threshold.

4. The hot live video determining method of claim 1, wherein the fragment information comprises a fragment identifier of the video fragment and wherein the fragment interval between any two of the requested video fragments being less than the preset fragment interval threshold represents a first fragment identifier of a first video fragment of any two of the requested video fragments and a second fragment identifier of a second video fragment in any two of the requested video fragments being the same.

5. The hot live video determining method of claim 1, wherein each of the plurality of video request messages further comprises an index file, wherein the index file comprises a video fragment list of the target video and fragment duration of each video fragment, wherein the statistical information further comprises duration of an interval between any two of the requested video fragments, and wherein determining the statistical information of the target video based on the plurality of video request messages comprises:

obtaining, based on the index file, first fragment duration of a first video fragment of any two of the requested video fragments and second fragment duration of a second video fragment of any two of the requested video fragments, and third fragment duration of a video fragment between the first video fragment and the second video fragment in the video fragment list; and determining duration of an interval between the first video fragment and the second video fragment, whether, wherein the target video is the hot live video when the quantity of video request messages for the target video in the specified duration exceeds the first threshold, and the duration of the interval between the first video fragment and the second video fragment in any two of the requested video fragments is less than the preset fragment interval threshold, wherein the preset fragment interval threshold is a second duration threshold.

6. The hot live video determining method of claim 1, wherein the statistical information further comprises a quantity of times of requesting each requested video fragment of the target video in the specified duration wherein the target video is the hot live video when the quantity of video request messages for the target video in the specified duration exceeds a first threshold, and there is a video fragment requested for a quantity of times that exceeds a second threshold in the specified duration.

7. The hot live video determining method of claim 1, further comprising receiving the plurality of video request messages for the target video from at least one network device of a network operator.

8. The hot live video determining method of claim 7, wherein after determining that the target video is the hot live video, the hot live video determining method further comprises:

obtaining a subsequent video fragment of the target video from a video server; and sending the subsequent video fragment of the target video to at least one of the network devices in a multicast bearer transmission manner based on the plurality of video request messages.

9. The hot live video determining method of claim 1, further comprising receiving the plurality of video request messages from a listening device of a network operator based on listening on at least one network device of the network operator.

10. A device, comprising:
a processor; and
a non-transitory computer readable medium storing computer-executable instructions which, when executed by the processor, cause the device to:

obtain a plurality of video request messages for a target video, wherein each of the plurality of video request messages comprises respective fragment information of a requested video fragment of the target video, determine statistical information of the target video based on the plurality of video request messages, wherein the statistical information comprises a quantity of video request messages from the plurality of video request messages that are obtained in a specified duration and fragment information of a video fragment that is requested in each of the plurality of video request messages, and determine, based on the statistical information, whether the target video is a hot live video, wherein the target video is the hot live video when the quantity of video request messages in the specified duration exceeds a first threshold and a fragment interval between any two requested video fragments in the specified duration is less than a preset fragment interval threshold.

11. The device of claim 10, wherein the fragment information comprises a playing time point of the video fragment, wherein the fragment interval between any two of the requested video fragments being less than the preset fragment interval threshold represents a difference between a first playing time point of a first video fragment in any two of the requested video fragments and a second playing time point of a second video fragment in any two of the requested video fragments being less than the preset fragment interval threshold, wherein the preset fragment interval threshold is a first duration threshold.

12. The device of claim 10, wherein the fragment information comprises a fragment identifier of the video fragment, wherein the fragment interval between any two of the requested video fragments being less than the preset fragment interval threshold represents a difference between a first fragment identifier of a first video fragment of any two of the requested video fragments and a second fragment identifier of a second video fragment in any two of the requested video fragments being less than the preset fragment interval threshold, wherein the preset fragment interval threshold is an identifier threshold.

13. The device of claim 10, wherein the fragment information comprises a fragment identifier of the video fragment and wherein the fragment interval between any two of the requested video fragments being less than the preset fragment interval threshold represents a first fragment identifier of a first video fragment of any two of the requested video fragments and a second fragment identifier of a second video fragment in any two of the requested video fragments being the same.

14. The device of claim 10, wherein each of the plurality of video request messages further comprises an index file, wherein the index file comprises a video fragment list of the target video and fragment duration of each video fragment; wherein the statistical information further comprises duration of an interval between any two of the requested video fragments, and wherein the computer-executable instructions further cause the device to determine the statistical information of the target video based on the plurality of video request messages by:

obtaining, based on the index file, first fragment duration of a first video fragment of any two of the requested video fragments and second fragment duration of a second video fragment of any two of the requested video fragments, and third fragment duration of a video fragment between the first video fragment and the second video fragment in the video fragment list; and determining duration of an interval between the first video fragment and the second video fragment, wherein the target video is the hot live video when the quantity of video request messages for the target video in the specified duration exceeds the first threshold, and the duration of the interval between the first video fragment and the second video fragment in any two of the requested video fragments is less than the preset fragment interval threshold, wherein the preset fragment interval threshold is a second duration threshold.

15. The device of claim 10, wherein the statistical information further comprises a quantity of times of requesting each requested video fragment of the target video in the specified duration, wherein the target video is the hot live video when the quantity of video request messages for the target video in the specified duration exceeds a first threshold, and there is a video fragment requested for a quantity of times that exceeds a second threshold in the specified duration.

16. The device of claim 10, wherein the computer-executable instructions further cause the device to receive the plurality of video request messages for the target video from at least one network device of a network operator.

17. The device of claim 16, wherein after determining that the target video is the hot live video, the computer-executable instructions further cause the device to:
   obtain a subsequent video fragment of the target video from a video server; and
   send the subsequent video fragment of the target video to at least one of the network devices in a multicast bearer transmission manner based on the plurality of video request messages.

18. The device of claim 10, wherein the computer-executable instructions further cause the device to receive the plurality of video request messages from a listening device of a network operator based on listening on at least one network device of the network operator.

* * * * *

UNITED STATES PATENT AND TRADEMARK OFFICE
CERTIFICATE OF CORRECTION

PATENT NO. : 10,841,633 B2
APPLICATION NO. : 16/213221
DATED : November 17, 2020
INVENTOR(S) : Qikun Wei et al.

Page 1 of 1

It is certified that error appears in the above-identified patent and that said Letters Patent is hereby corrected as shown below:

In the Claims

Claim 5, Column 17, Line 12 and 13: "video fragment, whether, wherein" should read "video fragment, wherein"

Signed and Sealed this
Fifth Day of January, 2021

Andrei Iancu
*Director of the United States Patent and Trademark Office*